United States Patent [19]

Tsujihara et al.

[11] Patent Number: 4,857,998
[45] Date of Patent: Aug. 15, 1989

[54] AUTOMATIC PRIMARY COLOR CONVERGENCE ALIGNMENT SYSTEM FOR PROJECTION TELEVISION

[75] Inventors: Susumu Tsujihara; Teruo Kataoka, both of Osaka, Japan

[73] Assignee: Matsushita Electric Industrial Co., Ltd., Osaka, Japan

[21] Appl. No.: 160,379

[22] Filed: Feb. 25, 1988

[30] Foreign Application Priority Data

| Feb. 26, 1987 | [JP] | Japan | 62-43324 |
| Mar. 26, 1987 | [JP] | Japan | 62-72440 |
| May 15, 1987 | [JP] | Japan | 62-119442 |
| Jul. 20, 1987 | [JP] | Japan | 62-180453 |

[51] Int. Cl.$^4$ .......................... H04N 9/28; H04N 9/31
[52] U.S. Cl. ......................... 358/60; 358/10; 358/64
[58] Field of Search ................. 358/10, 56, 60, 64

[56] References Cited

U.S. PATENT DOCUMENTS

| 3,479,448 | 11/1969 | Kollsman | 358/10 |
| 4,277,797 | 7/1981 | Dangschat et al. | 358/21 R |
| 4,485,394 | 11/1984 | Ghaem-Maghami et al. | 358/10 |
| 4,593,308 | 6/1986 | Kemplin | 358/10 |
| 4,625,153 | 11/1986 | Micic et al. | 358/10 |
| 4,683,467 | 7/1987 | Macaulay et al. | 358/10 |

FOREIGN PATENT DOCUMENTS

| 3311971 | 10/1984 | Fed. Rep. of Germany | 358/60 |
| 55-99882 | 7/1980 | Japan | 358/10 |
| 62-219791 | 9/1987 | Japan . |

*Primary Examiner*—James J. Groody
*Assistant Examiner*—Randall S. Svihla
*Attorney, Agent, or Firm*—Pollock, Vande Sande & Priddy

[57] ABSTRACT

An automatic primary color component covergence alignment system for a color television display apparatus is presented whereby an alignment pattern is periodically displayed in peripheral regions of the television screen, in each of the primary colors during respective successive correction intervals, the pattern positioned such as to fall upon photo-sensitive devices disposed at the screen periphery. Adjustment of pattern position is executed during each correction interval, based on position data derived from output signals from the photo-sensitive devices, such as to align the alignment pattern with predetermined reference positions. During each period between these sets of correction intervals, the position data thus derived are held stored and are continuously utilized for controlling the deflection of respective electron beams used in generating the primary colors, to thereby implement automatic convergence alignment adjustment.

11 Claims, 8 Drawing Sheets

AUTOMATIC PRIMARY COLOR CONVERGENCE ALIGNMENT SYSTEM FOR PROJECTION TELEVISION

BACKGROUND OF THE INVENTION

The present invention relates an automatic convergence alignment system for a color television display apparatus, and in particular to an automatic convergence alignment system whereby after initial manual adjustment of dynamic and static convergence alignment, static convergence alignment is subsequently adjusted automatically.

Figure 1:
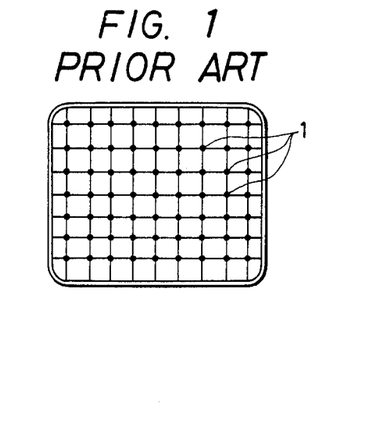
FIG. 1 shows a cross-hatch alignment pattern produced on a screen of a color television receiver, for assistance in describing a prior art method of convergence alignment.

The invention is especially applicable to projection display color television receivers. Generally speaking, a projection display type of television receiver utilizes three projection cathode ray tubes (referred to in the following as projection tubes) for generating displays of the three primary colors red, blue and green, in a large-scale picture projected on a display screen. The respective angles of incidence upon this screen of the three beams projected by these tubes will mutually differ to some extent, producing color errors in the displayed picture unless corrected, i.e. unless convergence alignment is executed such as to ensure correct registration between the respective color displays produced by the projection tubes. Such convergence alignment is basically of two types, dynamic and static. With dynamic convergence alignment, respective magnetic fields (generated by means of respective convergence yokes as described hereinafter) are applied to the electron beams produced by the projection tubes, which vary periodically in synchronism with the horizontal and vertical scanning of the beams such as to dynamically apply varying amounts of deflection of each beam such to ensure correct registration of the colors. With static convergence alignment, a fixed preset magnetic field is applied to each of the electron beams, such as to apply fixed amounts of deflection bias to each electron beam along the horizontal and vertical directions of the displayed picture, so as to ensure correct color registration. Usually, adjustment for both static and dynamic convergence alignment is carried out prior to use of such a television receiver, e.g. at the time of manufacture. However such convergence alignment adjustment requires a substantial amount of time and also a certain degree of operator skill, and hence is a disadvantage with regard to reducing manufacturing costs. In order to overcome this disadvantage, it has been proposed in the prior art to incorporate digital memory circuits in the television receiver, and to generate a cross-hatch display on the screen of the receiver, for each of the primary colors, as shown in FIG. 1. When initial convergence alignment has been carried out, then data representing the respective amounts of adjustment required for each of various adjustment points 1 (e.g. the cross-points of the cross-hatch alignment pattern) are stored as digital values in a 1-frame memory. During subsequent operation, the data for each of these adjustment points are read out and subjected to digital-analog conversion, to produce independent values of correction which are applied for each of the adjustment points. This has the advantage of providing very precise convergence alignment, since adjustment is performed independently for each of the adjustment points.

Figure 2:
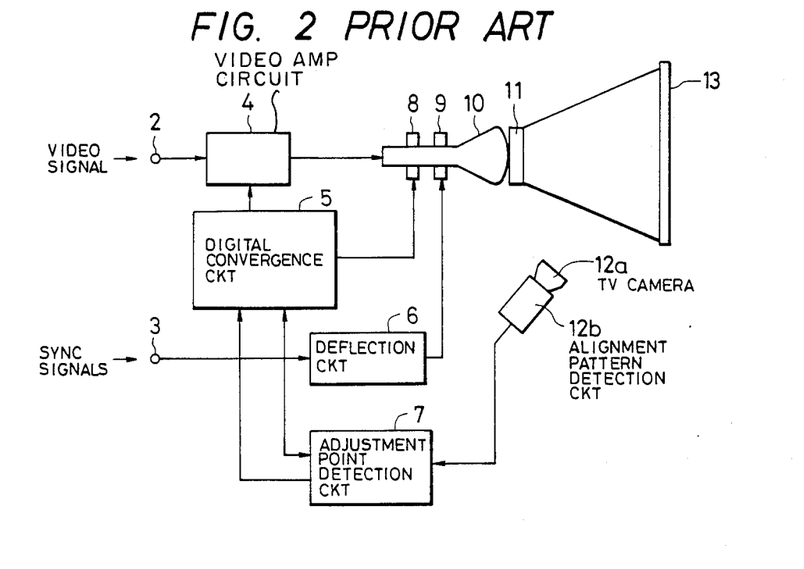
FIG. 2 is a general block circuit diagram for assistance in describing a second prior art method of convergence alignment.

A second method of convergence alignment which has been proposed in the prior art is designed to provide automatic convergence alignment during operation of a projection type color television receiver, and will be described referring to FIG. 2. Here, reference numeral 10 denotes one of the projection tubes of a projection type color television receiver, numeral 11 denotes a projection lens, numeral 13 the display screen, numeral 9 a deflection yoke, numeral 8 a convergence yoke. The projection tube 10 is driven from a video signal applied from an input terminal 2 through a video amplifier 4. Normally, the video amplifier 4 operates in the same way as the video amplifier of a direct-display color television receiver. However during adjustment of convergence alignment, a convergence alignment pattern such as a cross-hatch pattern (i.e. as for the prior art example of FIG. 1) is produced from a digital convergence circuit 5 and supplied to the video amplifier 4 to drive the projection tube 10. The deflection yoke 9 is driven by a deflection circuit 6, which operates in synchronism with horizontal and vertical synchronizing signals applied from an input terminal 3, to control scanning by the electron beam of the projection tube 10. Although as stated previously, such a projection type color television receiver generally incorporates three (R, G and B) projection tubes, only one of these is shown for simplicity of description. A television camera 12a is positioned to receive light from the screen 13, and video signals thus produced from the camera 12a are supplied to an alignment pattern detection circuit 12b, which functions to detect the alignment pattern displayed on the screen 13 as described above. Results of this detection are supplied to an adjustment point detection circuit 7, which detects the degree of convergence attained at each of the adjustment points of the alignment pattern, and accordingly modifies respective alignment compensation quantities which are produced for the respective adjustment points by the digital convergence circuit 7, in accordance with any misconvergence which is detected by the adjustment point detection circuit 7. In this way, automatic convergence alignment adjustment can be rapidly executed.

Another prior art method which has been proposed for executing automatic convergence alignment adjustment is basically similar to that of FIG. 2 described above, but utilizes a special screen having an array of photo-detector elements for detecting misconvergence. Description of this method will be omitted.

Each of the prior art convergence alignment methods described above can provide highly accurate convergence alignment. The second method, of FIG. 2, has the further advantage of being automatic. However in a practical projection type color television receiver, some mis-convergence will be produced immediately after power is switched on, and the amount of mis-convergence will thereafter gradually vary as the operating temperature of the receiver varies. In addition, drift of component characteristics over a period of use, changes in the neck charge of the projection tubes, drift in the DC level of the output signals from the digital convergence circuit, changes in shape of the convergence yoke due to the effects of heat, etc., will also combine to produce some mis-convergence. Such mis-convergence can in general be corrected by static convergence alignment adjustment (as defined hereinabove), and so will be referred to as static mis-convergence in the following. Thus, to ensure a reasonable degree of convergence alignment when such a prior art method of convergence alignment adjustment is used, it is necessary to carry out aging of the television receiver over a substantial period of time.

In addition, in the second prior art method described above in which a camera is used in detecting amounts of mis-convergence, it is necessary to perform complex signal processing and to utilize large-scale circuits, while moreover it is necessary to employ a substantially expensive video camera. In addition, it is not possible to view a normal television picture while such automatic convergence alignment is in progress, since the alignment pattern extends over the display screen.

In the case of the prior art method in which photo-detector elements are mounted directly on the screen, for detection of mis-convergence, the problem arises that it is necessary to utilize an auxiliary screen for executing convergence alignment adjustment and to use a main screen for the usual television display. Alternatively, it is necessary to provide a special screen which is a combination of such a main screen and auxiliary screen. Furthermore in the case of a front-projection type of display, the problem arises that errors will occur due to the effects of unwanted light falling on the photodetector elements from external sources.

SUMMARY OF THE INVENTION

It is an objective of the present invention to overcome the disadvantages of the prior art described above, by providing an automatic convergence alignment system incorporating photo-detector elements disposed at the periphery of a color television receiver screen for use in detecting mis-convergence, whereby only simple circuits are required to implement such detection and whereby automatic convergence alignment adjustment is executed periodically while a normal television picture is being displayed on the screen, and moreover whereby a high degree of alignment accuracy is attained.

To achieve the above objectives, a convergence alignment system according to the present invention for automatic convergence alignment adjustment of a picture displayed on a screen of a color television display apparatus essentially comprises:

convergence alignment means operable for position adjustment of said primary color components of the television picture;

photo-detection means disposed peripherally on said screen;

alignment pattern generating means for controlling said display apparatus to periodically display an alignment pattern on said screen in each of said primary colors during respective successively occurring correction intervals, said alignment pattern being positioned to be incident on said photo-detection means; and, signal processing and memory means responsive to photo-electric transducer signals produced from said photo-detection means by detection of said alignment pattern during each of said correction intervals for deriving position data for acting on said convergence alignment means to align said alignment pattern with at least one predetermined reference position defined relative to said photo-detection means, and for subsequently holding said position data and continuously supplying said position data to said convergence alignment means.

BRIEF DESCRIPTION OF THE DRAWINGS

FIG. 4(a) illustrates a screen having photodetector elements mounted peripherally thereon, and an alignment pattern.

DESCRIPTION OF THE PREFERRED EMBODIMENTS

Figure 3:
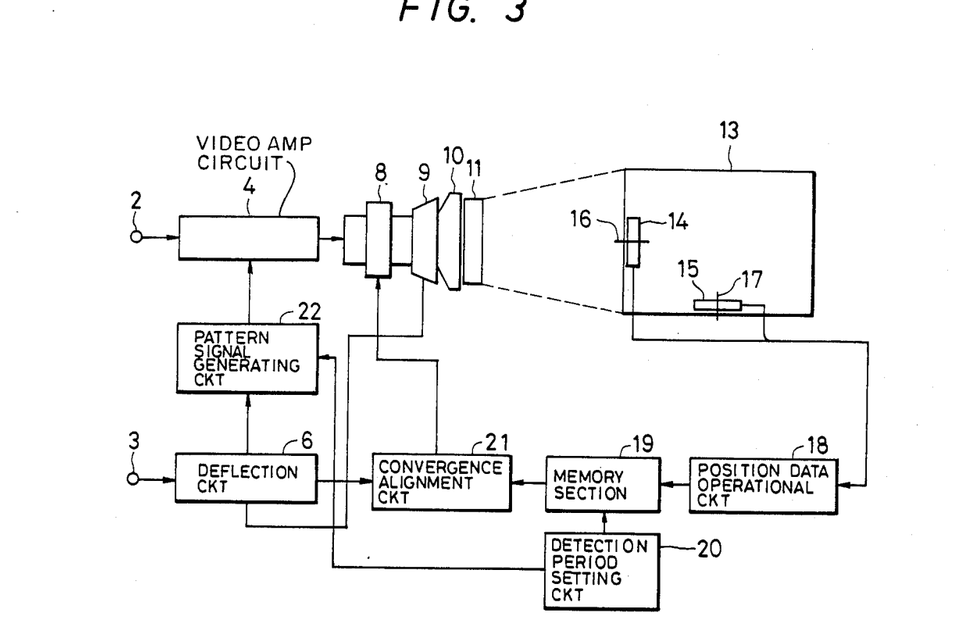
FIG. 3 is a general block circuit diagram of a first embodiment of a convergence alignment system according to the present invention.

FIG. 3 is a general block circuit diagram of a first embodiment of a convergence alignment system according to the present invention for a projection type color television receiver. As for the prior art example of FIG. 2, for simplicity of description, only a single projection tube 10 is shown out of the three projection tubes which are utilized in the television receiver for projecting light of the red, blue and green primary colors respectively onto a screen 13 as respective color components of a television picture. In the following, the embodiment will be described with reference to projection tube 10 which serves to project the red primary color. However identical control for executing automatic convergence alignment as described hereinafter is applied to each of the other two projection tubes of the television receiver, which are omitted from FIG. 3. In FIG. 3, components which are essentially identical to components in the prior art example of FIG. 2 are designated by corresponding reference numerals, and further description will be omitted. Reference numerals 14 and 15 denote photo-sensitive devices, which in this embodiment are each formed of a plurality of point-sensor photo-electric transducer elements as described hereinafter, disposed centrally at the periphery of the lower (horizontal) side and the periphery of the left (vertical) side of screen 13 respectively. A pattern signal generating circuit 22 periodically drives the video amplifier circuit 4 to produce an alignment pattern on the screen 13 consisting of an alignment pattern section (hereinafter referred to simply as a pattern section) 16 and a pattern section 17. This alignment pattern is displayed first in the red primary color during a fixed time interval extending over a plurality of picture fields, then in the green primary during a succeeding time interval, then in the blue primary color. A position data operational circuit 18 receives photoelectric transducer signals produced from the photosensitive devices 14 and 15, and derives from these signals data representing amounts of deviation of the pattern sections 16 and 17 from predetermined respective reference positions for these pattern sections, for each of the primary colors. In this embodiment, these reference positions are respectively defined at the centers of the photo-sensitive device 14 and photo-sensitive device 15.

The position data produced from the position data operational circuit 18 are stored in a memory section 19, and the stored data are outputted from the memory section 19 to be supplied to a conversion alignment circuit 21. The conversion alignment circuit 21 functions to apply drive signals to the convergence yoke 8 in accordance with the position data supplied from the memory section 19, such as to adjust the magnetic field applied to the electron beam of the projection tube 10 to execute correction of any position errors of the pattern sections 16 and 17. These correction operations for a specific primary color are executed periodically (with a repetition period referred to in the following as the detection period) during each of the intervals of fixed duration described above (referred to in the following as a correction interval) in which the alignment pattern is displayed in a specific primary color. Each of these correction intervals can for example extend over 30 successive scanning fields. During a correction interval for the red primary color, the pattern sections 16, 17 are displayed in red upon the screen 13 during each of a plurality of consecutive fields, and are similarly displayed in green during a correction interval for that color, and in blue during the succeeding correction interval. After such a position correction operation has been executed during one correction interval for the red primary color, by feedback control of projection tube 10 as described above, an identical position correction operation is executed for the green primary color, by control of the corresponding projection tube during a succeeding correction interval, then the operation is repeated for the blue color during a third correction interval. Upon completion of each correction interval, the data held in the corresponding memory section (e.g. memory section 19 for the red color) is fixedly supplied to the corresponding convergence alignment circuit, until the next three correction intervals begin. In this way, accurate convergence alignment is achieved by periodically adjusting the amounts of correction applied by the respective convergence yokes of the three projection tubes for the three primary colors, such that the alignment pattern generated in each color is precisely aligned at predetermined reference positions on the screen 13.

A detection period setting circuit 20 serves to control the duration of the detection period and the durations of the correction intervals, by control signals applied to the pattern signal generating circuit 22 and the memory section 19 (and the corresponding circuits for the other two primary colors) which respectively control the production of signals by the pattern signal generating circuit 22 and enabling/inhibiting of data write-in to the memory section 19 (and resultant updating of the data supplied by the memory section 19 to the conversion alignment circuit 21). The deflection circuit 6 operates in synchronism with the horizontal and vertical synchronizing signals of the television receiver, supplied from a terminal 3, and supplies corresponding synchronizing signals to the conversion alignment circuit 21 for synchronizing the operation of the conversion alignment circuit 21 with scanning operation of the projection tube 10.

Figure 4A:
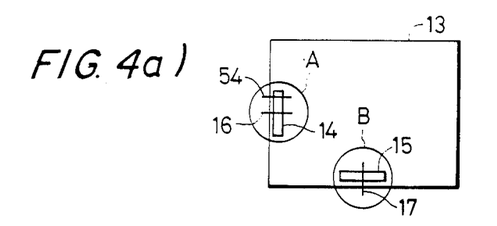
Figure 4B:
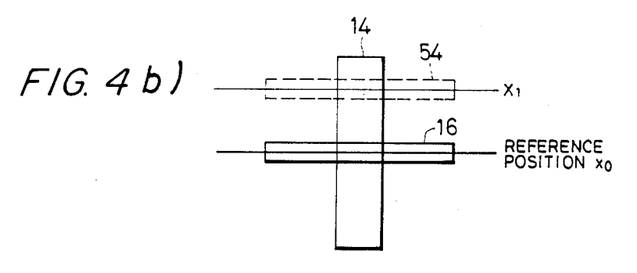
FIGS. 4(b) and 4(c) show details of the photo-sensitive device arrangement, for assistance in describing the first embodiment of the present invention.
Figure 4C:
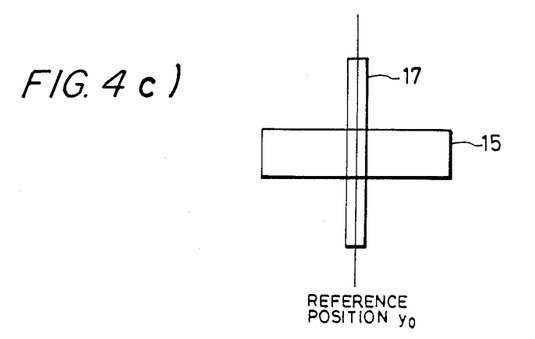

The operation of this embodiment is as follows. Initially, convergence alignment is performed manually, as in the prior art. This manual convergence alignment, which in general will include both static and dynamic convergence alignment, is performed utilizing adjustment means which are omitted from FIG. 3 for simplicity of description, and which can be of basically analog or digital type. Thereafter during operation of the television receiver, the red, green and blue alignment patterns (each consisting of the two pattern sections 16, 17) are displayed on the screen during respective correction intervals. As shown in FIG. 4(a) for example, the pattern sections 16, 17 of the red primary should be aligned at respective reference positions which are situated at the centers of the photo-sensitive devices 14, 15. Assuming however that the scanning beam of the projection tube for the green primary is not correctly aligned, then at the start of the next correction interval for that color the horizontal pattern section of the green primary, designated by numeral 54, will be mis-aligned for example as shown in FIG. 4(a). This is shown in greater detail in FIG. 4(b) and 4(c). During this correction interval, therefore, the convergence alignment circuit for the green pattern section will respond to the output data from the corresponding position data operational circuit by applying drive signals to the corresponding convergence yoke such as to move the pattern section 54 downward, until the central axis of that pattern section coincides with the reference position $x_0$ of the photo-sensitive device 14. That is to say, a static alignment convergence circuit in the conversion alignment circuit 21 responds to the position data for the green primary (i.e. data representing an amount of vertical position deviation for that primary) by driving the corresponding convergence yoke to produce the appropriate amount of bias to the electron beam for correcting that position deviation. At the same time, similar correction is applied to move the lower pattern section of the green primary to the left or right, if necessary, until its position coincides with the reference position defined at the center of the photo-sensitive device 15. In this way, the green primary is brought into convergence alignment with the red primary. In the succeeding correction interval a similar operation is executed for the blue primary.

In this way during each of the three successive correction intervals in which convergence alignment is executed for the red, green and blue primaries respectively, a feedback loop is established whereby correction signals are applied the corresponding convergence yoke such as to execute both vertical and lateral biasing of the electron beam to bring the alignment pattern into coincidence with the reference positions as described above. Subsequently, the position data representing the amount of position correction applied for each of the primary colors, held stored in the memory section 19, fixedly determines the degree of correction applied through the conversion alignment circuit 21 and the corresponding convergence yoke, until the next set of three correction intervals occurs. In this way accurate static convergence alignment and hence correct registration of colors displayed on screen 13 are automatically ensured, by maintaining the position of a periodically displayed alignment pattern in precise alignment with specific reference positions disposed at the screen periphery, for each of the three primary colors.

The detection period (between successive sets of correction intervals) can for example be set at approximately 30 minutes, during normal operation of the television receiver. However the detection period is preferably varied during an initial warm-up period after application of power to the receiver, under control of signals produced from the detection period setting circuit 20, as described in detail hereinafter. Each of the correction intervals can for example extend over approximately 30 consecutive scanning fields.

Figure 5:
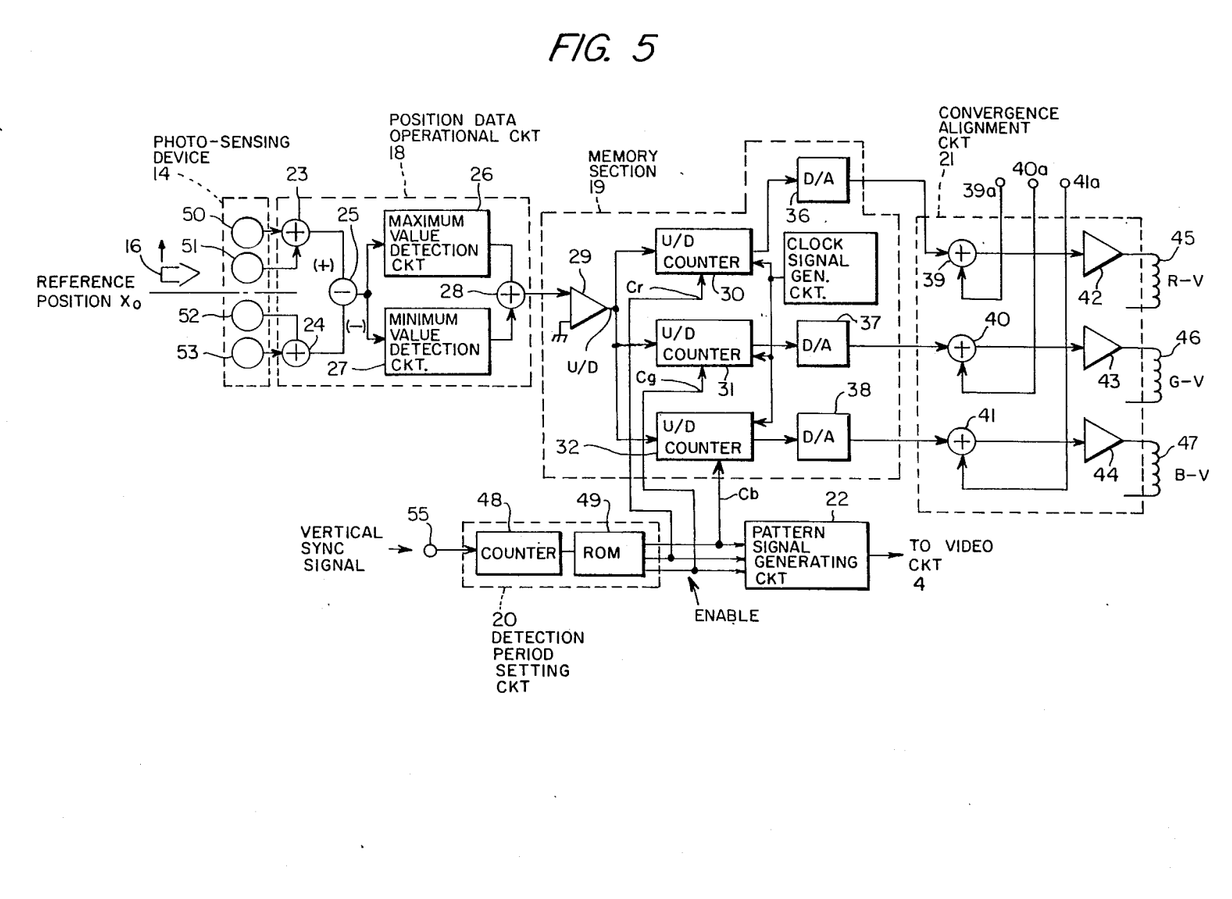
FIG. 5 is a partial block circuit diagram showing details of the convergence alignment system of the first embodiment.

FIG. 5 is a block circuit diagram showing details of the configurations of the photo-sensitive device 14 and the detection period setting circuit 20, and of part of the position data operational circuit 18, the memory section 19 and the conversion alignment circuit 21. To simplify the description, only components of the memory section 19 and conversion alignment circuit 21 relating to convergence alignment in the vertical direction are shown, and only the part of the position data operational circuit 18 which is coupled to the photo-sensitive device 14 and produces output signals for convergence alignment adjustment in the vertical direction is shown. Similar components are of course provided for executing convergence alignment in the horizontal direction, in response to signals produced from the photo-sensitive device 15 and for storing corresponding position data.

Figure 6A:
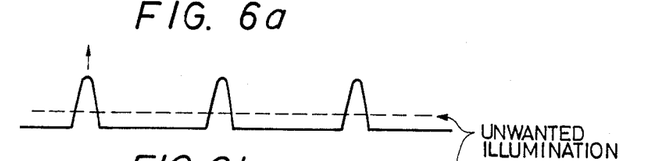
FIGS. 6(a) to 6(g) are waveform diagrams for assistance in describing the operation of the first embodiment.

As shown, the photo-sensitive device 14 consists of a vertically oriented linear array of four point-sensor photo-electric transducer elements designated as 50, 51, 52 and 53 respectively. In this embodiment, each of the photo-electric transducer elements 50 to 53 consists of a point sensor type of sensing element such as a photo-diode or photo-transistor. Light of the pattern section 16 which falls upon any of these photoelectric transducer elements 50 to 53 is converted to an electrical signal which is supplied to the position data operational circuit 18. The components of the position data operational circuit 18 which process these signals from the photo-sensitive device 14 consist of analog signal summing elements (referred to in the following simply as summing elements) 23, 24 and 28, a subtractor element 25, a maximum value detection circuit 26 and a minimum value detection circuit 27. The position data operational circuit 18 functions to derive from the output signals produced from the photosensitive device 14 a signal which represents an amount and direction of vertical position deviation of the pattern section 16 from the reference position $x_0$. This reference position $x_0$ is defined as a position at the center of the linear array of photo-electric transducer elements 50 to 53, i.e. with the photo-electric transducer element pairs 50, 51 and 52, 53 being respectively disposed symmetrically above and below the reference position $x_0$ as shown in FIG. 5. Photo-electric transducer signals produced from elements 50 and 51 are summed in the summing element 23, while signals produced from the elements 52 and 53 are summed in the summing element 24. The resultant sum output signals produced from the summing elements 23 and 24 are supplied to inputs of the subtractor element 25, to be mutually subtracted. If the pattern section 16 is correctly aligned at the reference position $x_0$, then signals having the waveform shown in FIGS. 6(a) and 6(b) will be produced from the summing elements 23, 24 respectively. The pulses shown in FIGS. 6(a), 6(c) are produced during respective consecutive scanning fields, and will be of identical amplitudes if there is no position deviation of the pattern section 16. As a result, an output signal level of zero will be produced from the subtractor element 25, as shown in FIG. 6(c).

Figure 6B:
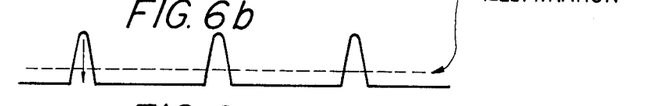
Figure 6C:
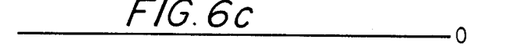
Figure 6D:
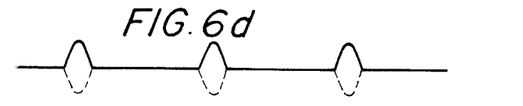

If on the other hand the pattern section 16 is displaced upwards, as indicated by the arrow in FIG. 5, then the amplitude of the output pulses produced from the summing element 23 will be increased and that of the output pulses from the summing element 24 decreased, as indicated by the arrows in FIGS. 6(a), 6(b). As a result, successive pulses will be produced from the subtractor element 25 as shown by the full-line waveform in FIG. 6(d). The amplitude of these pulses will increase (within certain limits) in accordance with the amount of deviation of the pattern section 16, while the positive polarity of the pulses indicates that the pattern section 16 has moved above the reference position $x_0$. This output signal from the subtractor element 25 will be referred to in the following as a deviation signal.

Conversely if the pattern section 16 is displaced downwards from the reference position $x_0$, then the amplitude of the output pulses produced from the summing element 24 will be increased and that of the output pulses from the summing element 23 decreased. As a result, successive negative-polarity pulses will be produced as the deviation signal from the subtractor element 25 as shown by the broken-line waveform in FIG. 6(d). The amplitude of these pulses will increase in accordance with the amount of deviation of the pattern section 16, while the negative polarity of the pulses indicates that the pattern section 16 has moved below the reference position $x_0$.

Figure 6E:
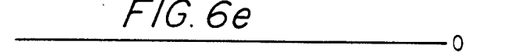
Figure 6F:
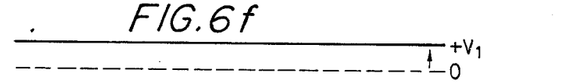
Figure 6G:
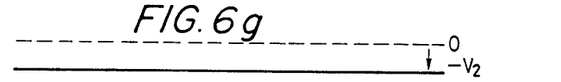

The deviation signal thus produced from the subtractor element 25 is supplied to respective inputs of the maximum value detection circuit 26 and minimum value detection circuit 27, which respectively detect the maximum and minimum levels of that signal and produce respective output signals in the form of DC levels which indicate the values of these maximum and minimum levels. These output signals from the maximum value detection circuit 26 and minimum value detection circuit 27 are summed in a summing element 28. A DC level (more precisely, a signal which remains at a fixed DC level during each interval between successive output pulses from the subtractor element 25), referred to in the following as a detection output signal, is thereby produced from the summing element 28 and is supplied to one input of a comparator 29 in the memory section 19. This detection output signal from the summing element 28 represents the amount and direction of position deviation of the pattern section 16 with respect to the reference position $x_0$. A reference potential of 0 V (corresponding to the reference position $x_0$) is applied to the other input of the comparator 29. Thus when the vertical position of the pattern section 16 coincides with the reference position $x_0$ defined by photo-sensitive device 14, the detection output signal from the summing element 28 will be at 0 V (as shown in FIG. 6(e)), while if the pattern section 16 is displaced upwards from that reference position then the detection output signal will be a positive DC level (e.g. $+V1$, as shown in FIG. 6(f)), while if the pattern section 16 is displaced downwards then the detection output signal will be a negative DC level (e.g. $-V2$, as shown in FIG. 6(g))

Figure 7:
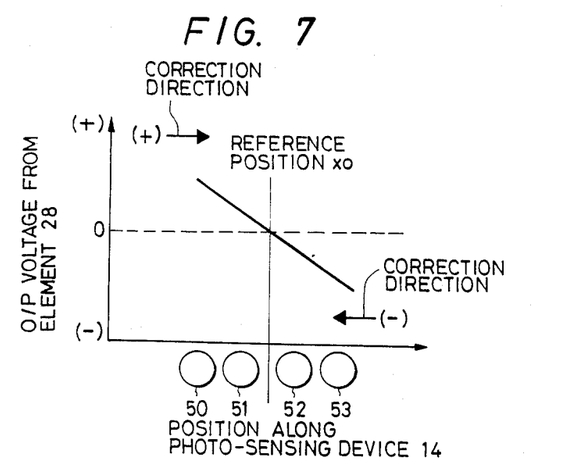
FIG. 7 graphically illustrates a relationship between deviation of an alignment pattern from a reference position and a corresponding position-indicating output signal produced in the first embodiment.

The relationship between displacement from the reference position $x_0$ of the vertical position of the pattern section 16 and the resultant output voltage produced from the summing element 28 is illustrated graphically in FIG. 7.

In actuality, the pattern section 16 is a line section having a finite width, so that an output voltage of zero is produced from the summing element 28 when the central axis of pattern section 16 is aligned with the reference position $x_0$, i.e. with portions of the pattern section 16 disposed symmetrically about the reference position $x_0$. Position information contained in the detection output signal from the position data operational circuit 18 represents the degree to which the pattern section light falls asymmetrically upon the photo-sensitive device 14. Since unwanted illumination from external sources will almost invariably fall symmetrically upon all of the photo-electric transducer elements 50 to 53 of the photo-sensitive device 14, the amplitudes of resultant signal components in the outputs from the summing elements 23 and 24 resulting from such unwanted illumination will be mutually identical, as illustrated by the broken-line portions of FIGS. 6(a), 6(b). Thus, such unwanted illumination will have no effect upon the output signal from the subtractor element 25, and hence no effect upon the output signal level from the position data operational circuit 18, unless the level of the unwanted illumination is so high that it prevents satisfactory operation of the photo-sensitive devices 14 and 15. It can thus be understood that this embodiment of the invention is inherently insensitive to the effects of unwanted illumination falling upon the photo-sensitive devices, so that the danger of erroneous operation resulting from such unwanted illumination is minimized, without the necessity for complex countermeasures to be adopted.

Figure 8:
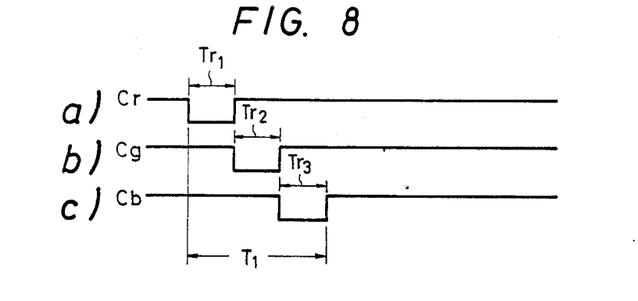
FIG. 8 is a timing diagram for illustrating respective timings of convergence alignment detection operations for each of the primary colors, with the first embodiment.

In addition to the comparator 29, the portion of the memory section 19 which deals with convergence correction in the vertical direction is made up of a set of up-down counters 30, 31 and 32, and a corresponding set of digital-analog (hereinafter referred to as D-A) converters 36, 37 and 38. Control signals produced by the detection period setting circuit 20 which define the respective correction intervals for the red, green and blue primary colors are shown in FIGS. 8(a) to (c), designated as Cr, Cg and Cb, with the respective correction intervals being designated as Tr1, Tr2 and Tr3 for the red, green and blue colors respectively. The interval from the beginning of Tr1 to the end of Tr3 will be referred to as the adjustment interval, designated as $T_l$.

During each Tr1 interval, control signals from the detection period setting circuit 20 enable counting of clock pulses (produced from a clock pulse source which is omitted from the drawings) by the up-down counter 30 which is utilized for vertical static convergence data of the red primary color (referred to in the following as R-V convergence alignment data), with counting being otherwise inhibited. Similarly during each Tr2 interval, counting by the up-down counter 31 which is utilized for vertical static convergence data of the green primary color (referred to in the following as G-V convergence alignment data) is enabled, and during each Tr3 interval, counting by the up-down counter 32 which is utilized for vertical static convergence data of the blue primary color (referred to in the following as B-V convergence alignment data) is enabled.

The comparator 29 produces a tri-state output signal, which is at the 0 V level when the output signal from the position data operational circuit 18 is at 0 V, i.e. when there is no position deviation of the pattern section 16 from the reference position $x_0$. The tri-state output signed is at a fixed positive DC voltage when the output signal from the position data operational circuit 18 is a positive voltage (indicating that the pattern section 16 is displaced above the reference position $x_0$. The tri state output signal is a fixed negative DC voltage when the output signal from the position data operational circuit 18 is a negative voltage (indicating that the pattern section 16 is displaced below the reference position $x_0$). When a positive voltage output is produced from the comparator 29 during one of the correction intervals Tr1 to Tb1 then counting up is executed by the corresponding one of the up-down counters 30 to 32, i.e. the counter which is currently enabled, whereas if the output voltage from the comparator 29 is negative then counting down is executed, and if the output voltage from the comparator 29 is zero then no counting is executed.

The portion of the conversion alignment circuit 21 utilized for vertical convergence alignment adjustment consists of a set of three summing elements 39, 40 and 41 and a corresponding set of three amplifiers 42, 43 and 44 for driving the R-V, G-V and B-V convergence yokes 45, 46 and 47 of the red, green and blue primary color projection tubes respectively. Manually presettable convergence alignment signals are applied through the summing elements 39, 40 and 41 to the amplifiers 42, 43 and 44 respectively, for executing static and dynamic convergence alignment of the red, green and blue primaries respectively, from input terminals 39a, 40a and 41a respectively. When the color television receiver is first set in operation (i.e. with a count of zero in each of counters 30 to 32), convergence alignment signals for implementing static and dynamic convergence alignment of the red, green and blue display colors are preset by manually adjustable means (not shown in the drawings) and are thereafter continuously applied from the input terminals 39a to 41a to the summing elements 39 to 41 respectively during operation of the television receiver. Various means are known in the art for generating such manually preset convergence alignment signals, and description of these will be omitted.

The operation of the system shown in FIG. 5 will be described for the of automatic vertical convergence alignment of the red primary color. At the start of a correction interval Tr1 of an adjustment interval $T_1$ shown in FIG. 8, the detection period setting circuit 20 begins to generate control signals, applied to the pattern signal generating circuit 22 and the memory section 19, whereby the alignment pattern described above with reference to FIGS. 4 (a to (c) is displayed in red on the screen 13 during each of a plurality of successive fields, and whereby counting by the up-down counter 30 is enabled while counting by up-down counters 31 and 32 is held inhibited. If at the start of this Tr1 interval the pattern section 16 is displaced from the reference position $x_0$ as shown in FIG. 5 then an output DC level will be produced from the comparator 29, whose polarity corresponds to the direction of the displacement. As a result, counting up or down begins to be executed by the up-down counter 30, in accordance with the polarity of the output signal from the comparator 29. The count value in up-down counter 30 is converted from a digital to an analog value by the digital-analog converter 36, and this analog value is supplied to the summing element 39 and hence to the amplifier 42, to produce a corresponding drive current component in the convergence yoke 45. The direction of this drive current component is such as to move the pattern section 16 in the opposite direction to the pattern position deviation from the reference position $x_0$, so that the pattern section is gradually moved into coincidence with the reference position $x_0$ during successive fields of the correction interval Tr1. When this position coincidence is attained, the output signal from the comparator 29 goes to 0 V as described hereinabove, which results in further counting by the up-down counter 30 being inhibited. At that point, the count contents of up-down counter 30 consist of a data value representing an amount of vertical position correction which must be applied by the R-V convergence yoke 45 to the projection tube generating the red primary color, in order to obtain correct display registration of that color. This count value is held unchanged thereafter, until the next occurrence of a Tr1 correction interval. It can thus be understood that during each Tr1 interval, a feedback loop is established by the combination of the photo-sensitive device 14, the position data operational circuit 18, the comparator 29, digital-analog converter 36, amplifier 42 and R-V convergence yoke 45, whereby the pattern section 16 is moved vertically into alignment with the reference position $x_0$. Upon completion of that Tr1 interval, the position data necessary for aligning the pattern section 16 is held memorized in, and fixedly produced from, the up-down counter 30 until the next Tr1 interval begins. Thus, the position data derived during interval Tr1 are continuously applied to the R-V convergence yoke for vertical position correction of the red primary component of the television picture during the succeeding detection period.

A similar operation is then executed for vertical convergence adjustment of the green primary, during correction interval Tr2, with in this case the count value in up-down counter 31 being adjusted to produce a requisite amount of vertical position correction by the G-V convergence yoke 46. The operation is then executed for the blue primary, using up-down counter 32 and convergence yoke 47.

During each of the Tr1, Tr2 and Tr3 intervals, horizontal position correction is also executed for the red, green and blue primary colors respectively by corresponding portions of the position operational circuit 18 (coupled to receive output signals from photo-sensitive device 15), the memory section 19, and convergence alignment circuit 21, in' the same manner as described above for vertical position correction.

Upon completion of a set of correction intervals Tr1, Tr2 and Tr3, static convergence alignment is maintained based on the count contents of the up-down counters 30 to 32 until the next occurrence of these intervals, i.e. until one detection period has elapsed. It can thus be understood that the up-down counters 30 to 32 function during each detection period as means for memorizing position data which are required for automatic convergence alignment operation.

Figure 9:
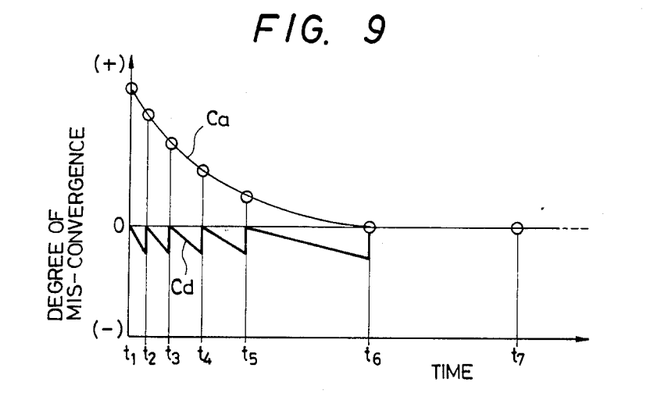
FIG. 9 is a diagram for illustrating variation of a detection, period after power switch-on, with the first embodiment.

In order to reduce the possibility of erroneous operation of such a system due to the effects of unwanted illumination falling upon the photo-sensitive devices, it has been found that the detection period should be made substantially long, consistent with correct operation of the system. It will be clear that the minimum requisite value of detection period will be determined by the anticipated maximum rate of change of position drift of the alignment pattern with respect to the reference positions. It has been found that this rate of drift is substantially greater during a time interval following switch-on of power to the television receiver than that during subsequent operation. For this reason, the embodiment of FIG. 5 functions to vary the detection period such as to be shorter during that interval following power switch-on than during normal operation. This is illustrated in FIG. 9, in which position deviation of the alignment pattern, e.g. deviation of pattern section 16 with respect to the reference position $x_0$ of photo-sensitive device 14, is plotted along the vertical axis, and time along the horizontal axis. Characteristic $C_a$ shows the manner in which this deviation occurs if no automatic convergence alignment is executed, while $C_d$ shows the deviation variation when automatic convergence alignment in accordance with the system of FIG. 5 is executed. Each of the time points designated as $t_1$ to $t_7$ indicates a timing at which a convergence alignment operation is executed, i.e. during an adjustment interval $T_1$ as described above. The time origin $t_1$ is the point at which power to the television receiver is switched on. As shown, the correction period is initially short (i.e. $t_2 - t_l$) immediately after power switch-on, and is thereafter gradually increased. In this way only small amounts of alignment pattern position deviation, and hence only small amounts of mis-convergence, will occur even during the period immediately after power switch-on, as illustrated by characteristic $C_d$.

The detection period is determined by the detection period setting circuit 20, which as shown in FIG. 5 includes a counter circuit 48 and a ROM (read-only memory) 49. The counter 48 counts vertical synchronizing signal pulses supplied from a terminal 55, to produce successive address signals for read-out of data stored in the ROM 49. The ROM 49 has stored therein (prior to operation of the television receiver) a set of data values which are read out to determine successive values of the detection period, i.e. determine the timings at which control signals of the form shown in FIG. 8 are produced for controlling the memory section 19 and pattern signal generating circuit 22 as described above, such that the detection period varies as shown in FIG. 9 during the period immediately after power switch-on.

Figure 10:
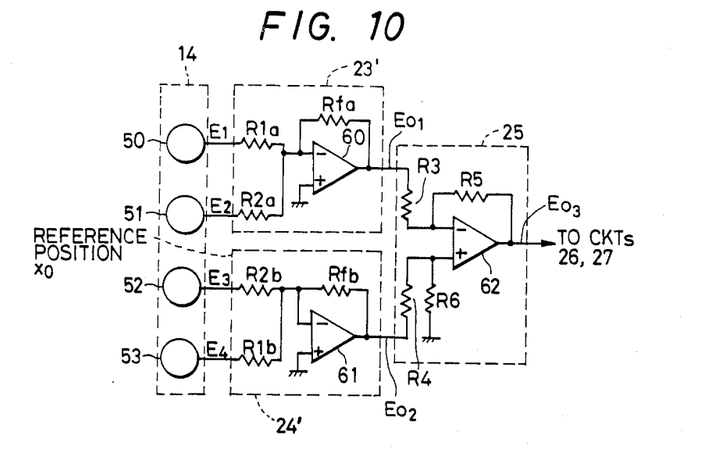
FIG. 10 is a block circuit diagram showing essential portions of a second embodiment of a convergence alignment system according to the present invention.

FIG. 10 is a circuit diagram of a portion of a second embodiment of an automatic convergence alignment system according to the present invention. This embodiment is essentially a modification of the first embodiment described above, and so only the points of difference from the first embodiment will be described. In FIG. 10, 23' and 24' denote circuits functioning as summing elements, corresponding to the summing elements 23 and 24 of FIG. 5, in a position data operational circuit 18 which is identical in configuration to that of FIG. 5. The photo-sensitive device 14 and subtractor element 25 are functionally identical to those of FIG. 5. As shown, the subtractor element 25 consists of an operational amplifier 62 having input resistors R3 and R4 coupled to the inverting and non-inverting inputs and a feedback resistor R5 connected between the non-inverting input and the output, and a resistor R6 connected from the non-inverting input to ground potential. As in the first embodiment, the output signal from the subtractor element 25 is applied to a maximum value detection circuit 26 and a minimum value detection circuit 27 whose output signals are summed in a summing element 28 as shown in FIG. 5. The embodiment of FIG. 10 differs from that of FIG. 5 in that the photo-electric transducer signals produced from the pair of photo-electric transducer elements 51 and 52 of the photo-sensitive device 14, which are disposed closest to the reference position $x_0$, have greater weighting values than the signals produced from the photo-electric transducer elements 50 and 53.

Figure 11:
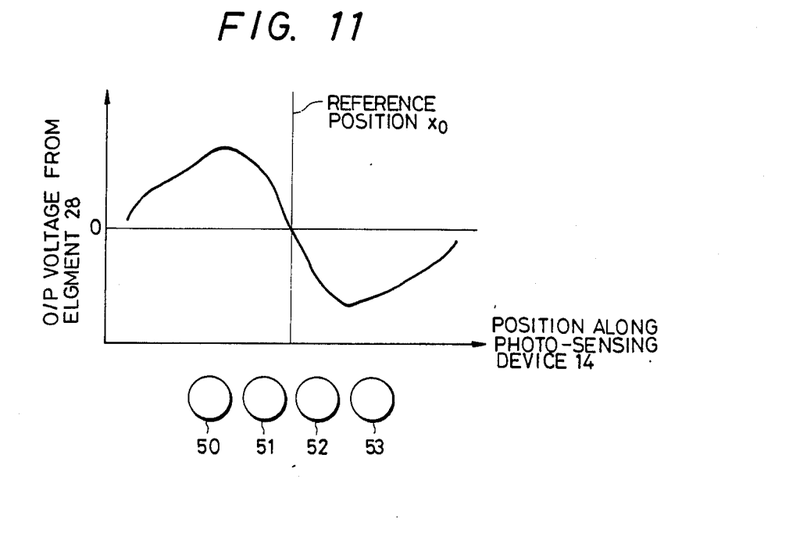
FIG. 11 is a diagram illustrating a relationship between deviation of an alignment pattern from a reference position and a corresponding position-indicating output signal produced in the second embodiment.

Specifically, the summing element 23' consists of two current summing resistors R1a and R2a coupled to the inverting input of an operational amplifier 60, with a feedback resistor Rfa coupled back from the operational amplifier output to the inverting input, and with the operational amplifier non-inverting input being connected to ground potential (0 V). The summing element 24' has a similar configuration, as shown, with input resistors R1b and R2b, feedback resistor Rfb and operational amplifier 61. In order to provide greater weighting of the output signals from the photo-electric transducer elements 51 and 52 by comparison with those from photo-electric transducer elements 53 and 50, the values of input resistors R2a and R2b are made lower than those of resistors R1a and R1b. In this way an effectively increased sensitivity is attained for the two photo-electric transducer elements most closely adjacent to the reference position $x_0$ by comparison with that of the two outermost photo-electric transducer elements. As a result, the relationship between variation of vertical position of the center of pattern section 16 relative to the reference position $x_0$ (plotted along the horizontal axis) and resultant output signal level from the summing element 28 (plotted along the vertical axis) is as shown in FIG. 11. It can be seen that there is a high rate of change of output signal from the summing element 28 for position variations in the vicinity of the reference position $x_0$, while more gradual rates of change of the output signal are produced at positions which are further from the reference position. This feature serves to ensure greater precision of convergence alignment control at those positions where high precision is necessary, i.e. in the vicinity of the reference position $x_0$, so that the convergence alignment pattern can be maintained precisely aligned with the reference positions. A similar circuit arrangement to that shown in FIG. 10 is of course utilized in the portion of the position data operational circuit 18 which is coupled to the photosensitive device 15, used for lateral position alignment.

Figure 12:
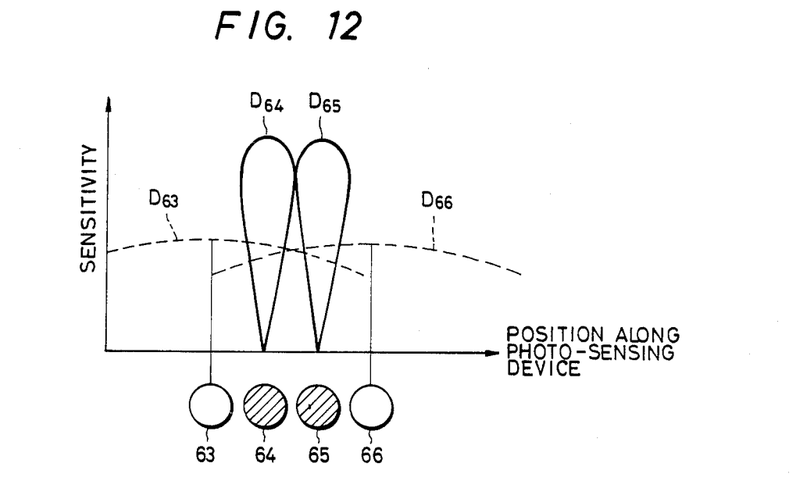
FIG. 12 is a diagram for illustrating directional and sensitivity characteristics of photo-detector elements in a modification of the second embodiment.

Rather than ensuring increased detection sensitivity for the photo-electric transducer elements which are immediately adjacent to the reference position by applying weighting to the output signals from the photo-electric transducer elements, as in FIG. 10, it is possible to utilize photo-electric transducer elements having higher values of sensitivity and directivity for the photo-electric transducer elements adjacent to the reference position. This is illustrated in FIG. 12, in which photo-electric transducer element sensitivity is plotted along the vertical axis and position along the horizontal axis. As indicated, a pair of photo-electric transducer elements 64 and 65 having relatively high values of sensitivity and directivity, as indicated by the corresponding directivity patterns $D_{64}$, $D_{65}$, are positioned adjacent to the reference position $x_0$, while an outer pair of photo-electric transducer elements 63 and 66 have relatively low values of sensitivity and directivity as indicated by the corresponding directivity patterns $D_{63}$, $D_{66}$. In this way, substantially similar effects to the embodiment of FIG. 10 can be attained.

As stated hereinabove, the embodiment of FIG. 5 is inherently insensitive to the effects of unwanted illumination falling upon the photo-sensitive devices 14 and 15, while in addition any adverse effects of such unwanted illumination are further reduced by the fact that alignment pattern position detection and adjustment operations are executed only during periodically occurring brief intervals. However if an excessively high level of illumination should temporarily fall upon the photo-sensitive devices then there is a possibility of erroneous operation of the automatic convergence alignment system. Although not shown in the drawings, the embodiment of FIG. 5 further includes means for comparing the position data obtained during each adjustment interval $T_1$ (shown in FIG. 8), i.e. the data contents of the up-down counters 30, 31 and 32, with the position data which were obtained and stored as count values in counters 30 to 32 in the preceding detection period. If it is found as a result of this comparison that there has been an excessive amount of change in this position data, then since this may indicate that erroneous operation of the automatic convergence alignment system has occurred due to the effects of a high level of unwanted illumination temporarily falling upon the photo-sensitive devices 14 and 15, the most recently obtained position data are rejected and the data obtained during the preceding detection period continue to be utilized for convergence alignment until the next $T_1$ adjustment interval occurs.

Figure 13:
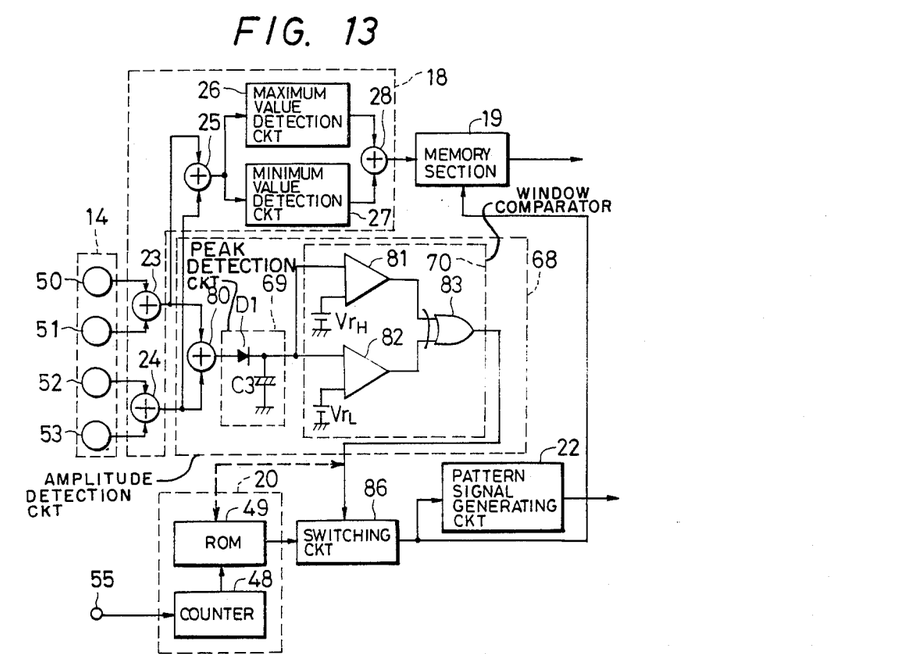
FIG. 13 is a block circuit diagram of essential portions of a third embodiment of the present invention; and, FIG. 14 is a diagram for graphically illustrating operating modes of the third embodiment.

FIG. 13 is a partial block circuit diagram of another embodiment of a convergence alignment according to the present invention which is a modification of that of FIG. 5 and includes a circuit which is used to further reduce the possibility of erroneous convergence alignment operation resulting from a high level of unwanted illumination falling upon the photo-sensitive devices 14, 15. This circuit functions to detect when the peak level of the total amount of light falling upon all of the photo-electric transducer elements of photo-sensitive device 14 or 15 exceeds a predetermined level, indicating that an excessive amount of unwanted illumination is falling upon the photo-sensitive device, and to inhibit further automatic convergence alignment detection/adjustment operations when such a condition is detected.

In FIG. 13, the photo-sensitive device 14, position data operational circuit 18, memory section 19, detection period setting circuit 20 and pattern signal generating circuit 22 correspond to those of the embodiment of FIG. 5 described above, and further description will be omitted. Numeral 68 denotes an amplitude detection circuit, made up of a peak detection circuit 69, a summing element 80, and a window comparator 70 consisting of two comparators 81 and 82 and an exclusive-OR gate 83. The comparison levels of the window comparator 70 are a lower reference voltage $V_{rL}$ and an upper reference voltage $V_{rH}$. The output signals from the summing elements 23 and 24 of the position data operational circuit 18 are applied (in addition to being applied to the subtractor element 25) to respective inputs of the summing element 80, which thereby produces an output signal that varies in proportion to the total level of illumination falling upon all of the photo-electric transducer elements 50 to 53 of the photo-sensitive device 14. The peak value of this output signal from the summing element 80 is detected by the peak detection circuit 69, consisting of a diode $D_I$ and a capacitor $C_3$. The resultant peak detection output signal is supplied to the window comparator 70 for comparison with the reference voltages $V_{rH}$ and $V_{rL}$. When the value of the output signal from the peak detection circuit 69 is in the range between these reference voltage values, an output signal fixed at a high logic level potential is produced from the window comparator 70, indicating that alignment pattern light is periodically falling upon the photo-sensitive device 14 and that the level of unwanted illumination is not excessively high. When the output from peak detection circuit 69 is lower than the level $V_{rL}$ (indicating that no alignment pattern light is periodically falling upon the photo-sensitive device 14), then the output from window comparator 70 is fixed at a low logic level potential. When the output from peak detection circuit 69 is higher than the level $V_{rH}$ (indicating that the level of unwanted illumination falling upon the photo-sensitive device 14 is excessively high), then the output from window comparator 70 is fixed at the low logic level potential.

The output signal thus produced from the window comparator 70 is applied as a control signal to a switching circuit 86, which functions to transfer the control signals produced from the detection period setting circuit 20 as described hereinabove to the pattern signal generating circuit 22 and the memory section 19, so long as the output signal from comparator 70 is at the high potential, and to inhibit transfer of the control signals from the detection period setting circuit 20 so long as the output signal from comparator 70 is at the low potential. In this way, automatic convergence alignment detection/adjustment operations are enabled only when alignment pattern light produced in response to pattern signals from the pattern signal generating circuit 22 is periodically falling upon the photo-sensitive device 14 and an excessive level of unwanted illumination is not falling upon photo-sensitive device 14.

Figure 14:
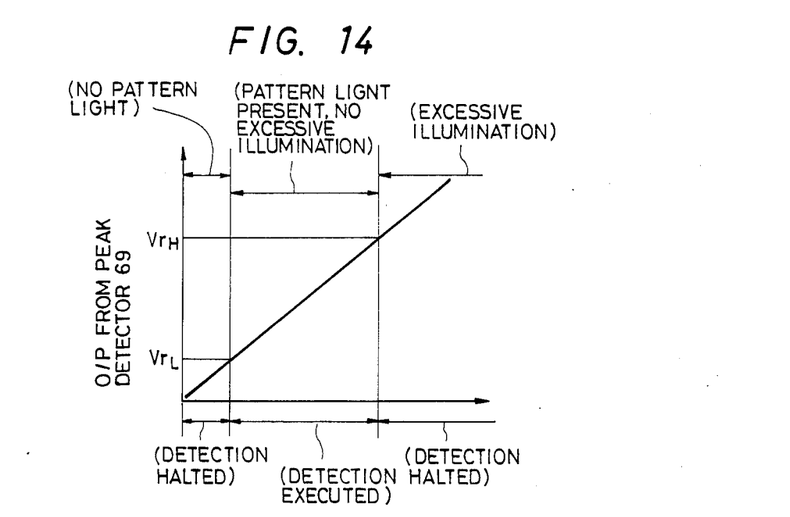

The relationship between levels of output voltage from the peak detection circuit 69 and operation of the automatic convergence alignment system is illustrated graphically in the operation diagram of FIG. 14.

In the above description of the embodiment of FIG. 13, the control signal produced from the amplitude detection circuit 68 is utilized to enable or inhibit the periodically executed alignment pattern detection/position adjustment operations. However in general, the output from circuit 68 can be utilized to control the operation of the detection period setting circuit 20 such as to vary the detection period in accordance with the level of unwanted illumination falling on the photo-sensitive devices, e.g. to increase the detection period when an excessive degree of unwanted illumination is detected and to return the detection period to a normal value when the excessive unwanted illumination is no longer detected. This can be accomplished for example by applying the control signal from the amplitude detection circuit 68 to the detection period setting circuit 20 as indicated by the broken line in FIG. 13. In this case, the detection period can be fixed at a different value, when excessive unwanted illumination is detected, from the value during normal operation.

From the above description it can be understood that an automatic convergence alignment system according to the present invention enables accurate automatic convergence alignment adjustment of a color television display system, and in particular a projection color television display system, with only a simple circuit configuration being required, and with only a pair of photo-sensitive devices required to be mounted on the display screen. Such an automatic convergence alignment system has been found to achieve reliable operation, irrespective of the effects of ambient illumination, and provides automatic adjustment of static convergence alignment to counteract the effects of operating temperature variations, drift of component characteristics due to aging, etc.

It will be understood from the above description that an automatic convergence alignment system according to the present invention also provides automatic correction of picture phase, in addition to convergence alignment adjustment, which is a further significant advantage of the invention.

Although the present invention has been described in the above with reference to an automatic convergence alignment system for a projection display color television receiver, the invention is equally applicable to a direct-display color television display.

It should also be noted that although the embodiments of the present invention have been described as utilizing photo-sensitive devices each formed of a plurality of discrete photo-electric transducer elements, it would be equally possible to utilize a linear type of photo-sensitive device, such as a linear photo-sensitive device having an inherent position data determination capability.

It should also be noted that the photo-sensitive devices of an automatic convergence alignment system according to the present invention can be respectively mounted in regions of the display screen which are within the periphery of the screen region normally used to display the television picture, or at positions which are outside that periphery. The photo-sensitive devices are preferably mounted at positions which lie along the central (i.e. horizontal and vertical) axes of the screen.

Furthermore although the embodiments of the present invention described above employ a detection period setting circuit (20) which controls the period of successive convergence alignment detection/adjustment operations based upon predetermined data values stored in a ROM, it would be equally possible to configure the circuit such that the detection period is automatically varied in accordance with a detected amount of positional deviation of the alignment pattern from the reference positions.

It should moreover be noted that although the present invention has been described in the above with reference to an automatic convergence alignment system for executing adjustment of static convergence alignment, the invention could be equally applied to a system for executing automatic adjustment of dynamic convergence alignment. In that case, for example, an additional photo-sensitive device for detection of vertical position deviation of the alignment pattern could be mounted on the display screen periphery, at the opposing side to that of the described embodiments (i.e. opposite to photo-sensitive device 14), with automatic adjustment of a dynamic convergence alignment signal being executed in accordance with differences between output signals from these photo-sensitive devices. Such automatic dynamic convergence alignment could of course be combined with automatic static convergence alignment as described hereinabove.

What is claimed is:

1. An automatic convergence alignment system for a color television display apparatus which displays a television picture on a screen as a combination of primary color components, comprising:
    convergence alignment means operable for position adjustment of said primary color components of the television picture;
    photodetection means disposed peripherally on said screen;
    alignment pattern generating means for controlling said display apparatus to periodically display an alignment pattern on peripheral regions of said screen in each of said primary color components during respective successively occurring correction intervals, said alignment pattern being positioned to be incident on said photodetection means;
    signal processing and memory means responsive to photoelectric transducer signals produced by said photodetection means by detection of said alignment pattern during each of said correction intervals for deriving position data for causing said convergence alignment means to align said alignment pattern with at least one predetermined reference position defined relative to said photodetection means, and for subsequently holding said position data and continuously supplying said position data to said convergence alignment means; and
    detection period control means for controlling a detection period which is a repetition period of said corrections intervals.

2. An automatic convergence alignment system according to claim 1, in which said detection period control means functions to make said detection period relatively short during an initial interval of operation of said television display apparatus and to thereafter increase the duration of said detection period.

3. An automatic convergence alignment system according to claim 1, in which said detection period control means is controlled such as to vary said detection period in accordance with an anticipated amount of position deviation of said alignment pattern from said reference position.

4. An automatic convergence alignment system according to claim 1 in which said photodetection means comprises at least one photosensitive device formed of an array of photoelectric transducer elements, and in which said signal processing and memory means comprises circuit means coupled to receive photoelectric transducer signals produced from respective ones of said photoelectric transducer elements for deriving a detection output signal having a polarity and magnitude respectively representing a direction and amount of position deviation of said alignment pattern from said reference position, and in which said automatic convergence alignment system functions during each of said correction intervals to generate said position data as a data value, applied to control said convergence alignment means, which is varied until said detection output signal reaches zero and is thereafter held constant during a succeeding detection period.

5. An automatic convergence alignment system according to claim 4, in which said alignment pattern is displayed in each of successive fields of said picture during each of said correction intervals whereby said photoelectric transducer signals from said photoelectric transducer elements are generated as pulse trains, and in which said circuit means for deriving said detection output signal comprises means for deriving from said photoelectric transducer signals of said photoelectric transducer elements a deviation signal representing an amount of position deviation of said alignment pattern from said reference position, maximum amplitude detection means for detecting a maximum amplitude of said deviation signal and producing a DC signal level representing said maximum amplitude, minimum amplitude detection means for detecting a minimum amplitude of said deviation signal and producing a DC signal level representing said minimum amplitude, and signal summing means for summing said DC signal levels from said maximum amplitude detection means and minimum amplitude detection means to produce said detection output signal.

6. An automatic convergence alignment system according to claim 5, in which said deviation signal is derived as a difference signal between two signals respectively derived from photoelectric transducer signals produced by respective sets of said photoelectric transducer elements disposed symmetrically on opposing sides of said reference position.

7. An automatic convergence alignment system for a color television display apparatus which displays a television picture of a screen as a combination of primary color components, comprising:
    convergence alignment means operable for position adjustment of said primary color components of the television picture;
    photodetection means disposed peripherally on said screen;
    alignment pattern generating means for controlling said display apparatus to periodically display an alignment pattern on peripheral regions of said screen in each of said primary color components during respective successively occurring correction intervals, said alignment pattern being positioned to be incident on said photodetection means; and
    signal processing and memory means responsive to photoelectric transducer signals produced by said photodetection means by detection of said alignment pattern during each of said correction intervals for deriving position data for causing said convergence alignment means to align said alignment pattern with at least one predetermined reference position defined relative to said photodetection means, and for subsequently holding said position data and continuously supplying said position data to said convergence alignment means;
    in which said photodetection means comprises at least one photosensitive device formed of an array of successively positioned photoelectric transducer elements disposed symmetrically about said reference position, and in which a higher degree of detection sensitivity is implemented for specific ones of said photoelectric transducer elements which are positioned closely adjacent to said reference position than the detection sensitivity of the remainder of said photoelectric transducer elements of said photosensitive device.

8. An automatic convergence alignment system for a color television display apparatus which displays a television picture on a screen as a combination of primary color components, comprising:

convergence alignment means operable for position adjustment of said primary color components of the television picture;

photodetection means disposed peripherally on said screen;

alignment pattern generating means for controlling said display apparatus to periodically display an alignment pattern on peripheral regions of said screen in each of said primary color components during respective successively occurring correction intervals, said alignment pattern being positioned to be incident on said photodetection means;

signal processing and memory means responsive to photoelectric transducer signals produced by said photodetection means by detection of said alignment pattern during each of said correction intervals for deriving position data for causing said convergence alignment means to align said alignment pattern with at least one predetermined reference position defined relative to said photodetection means, and for subsequently holding said position data and continuously supplying said position data to said convergence alignment means;

detection period control means for controlling a detection period which is a repetition period of said correction intervals; and means for detecting whether or not a total amount of light received by said photodetection means exceeds a predetermined level, for producing an output signal in accordance with results of said detection and for controlling said detection period control means by said output signal to vary said detection period in accordance with said detection results.

9. An automatic convergence alignment system for a color television display apparatus which displays a television picture on a screen as a combination of primary color components, comprising:

convergence alignment means operable for position adjustment of said primary color components of the television picture;

first photodetection means disposed peripherally on a vertically extending side of said screen and second photodetection means disposed peripherally on a horizontally extending side of said screen, each said photodetection means comprising an array of photoelectric transducer elements;

alignment pattern generating means for controlling said display apparatus to periodically display an alignment pattern on peripheral regions of said screen in each of said primary color components during respective successively occurring correction intervals, first and second predetermined portions of said alignment pattern being positioned to be respectively incident on said first and second photodetection means; and signal processing and memory means responsive to respective photoelectric transducer signals produced by said first and second photodetection means by detection of said first and second predetermined portions respectively of said alignment pattern during each of said correction intervals for deriving position data for causing said convergence alignment means to align said first and second predetermined portions of said alignment pattern with first and second predetermined reference positions, respectively, which are defined at respective central positions of said element arrays of said first and second photodetection means, and for subsequently holding said position data and continuously supplying said position data to said convergence alignment means.

10. An automatic convergence alignment system for a color television display apparatus which displays a television picture on a screen as a combination of primary color components, comprising:

convergence alignment means operable for position adjustment of said primary color components of the television picture;

photodetection means disposed peripherally on said screen;

alignment pattern generating means for controlling said display apparatus to periodically display an alignment pattern on peripheral regions of said screen in each of said primary color components during respective successively occurring correction intervals, said alignment pattern being positioned to be incident on said photodetection means; and signal processing and memory means responsive to first and second photoelectric transducer signals respectively produced by two portions of said photodetection means disposed symmetrically about a reference position by detection of said alignment pattern during each of said correction intervals for detecting a difference between said first and second photoelectric transducer signals and deriving position data for causing said convergence alignment means to execute position correction of said alignment pattern such as to reduce said difference to zero, for thereby aligning said alignment pattern with said reference position, and for subsequently holding said position data and continuously supplying said position data to said convergence alignment means.

11. automatic convergence alignment system for a color television display apparatus which displays a television picture on a screen as a combination of primary color components, comprising:

convergence alignment means operable for position adjustment of said primary color components of the television picture;

photodetection means disposed peripherally on said screen;

alignment pattern generating means for controlling said display apparatus to periodically display an alignment pattern on peripheral regions of said screen in each of said primary color components during respective successively occurring correction intervals, said alignment pattern being positioned to be incident on said photodetection means;

signal processing and memory means responsive to photoelectric transducer signals produced by said photodetection means by detection of said alignment pattern during each of said correction intervals for deriving position data for causing said convergence alignment means to align said alignment pattern with at least one predetermined reference position defined relative to said photodetection means, and for subsequently holding said position data and continuously supplying said position data to said convergence alignment means; and means for detecting whether or not a total amount of light received by said photodetection means exceeds a predetermined level, for producing an output signal in accordance with results of said detection and for controlling said signal processing and memory means by said output signal to inhibit signal processing operation by said signal processing and memory means when said predetermined level is exceeded.

* * * * *